United States Patent
Chaudhury et al.

(10) Patent No.: US 10,885,111 B2
(45) Date of Patent: Jan. 5, 2021

(54) GENERATING CROSS-DOMAIN DATA USING VARIATIONAL MAPPING BETWEEN EMBEDDING SPACES

(71) Applicant: INTERNATIONAL BUSINESS MACHINES CORPORATION, Armonk, NY (US)

(72) Inventors: Subhajit Chaudhury, Kanagawa (JP); Sakyasingha Dasgupta, Tokyo (JP); Asim Munawar, Ichikawa (JP); Ryuki Tachibana, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 325 days.

(21) Appl. No.: 15/953,986

(22) Filed: Apr. 16, 2018

(65) Prior Publication Data
US 2019/0318040 A1 Oct. 17, 2019

(51) Int. Cl.
*G06F 16/84* (2019.01)
*G06N 3/08* (2006.01)

(52) U.S. Cl.
CPC .............. *G06F 16/86* (2019.01); *G06N 3/08* (2013.01)

(58) Field of Classification Search
USPC ................................................ 707/756, 728
See application file for complete search history.

(56) References Cited

U.S. PATENT DOCUMENTS 9,256,693 B2* 2/2016 Nice ................. G06F 16/24575
9,280,562 B1 3/2016 Zhang et al.
9,280,709 B2* 3/2016 Suzuki ................... G06F 16/739
9,811,765 B2 11/2017 Wang et al.
2011/0170781 A1 7/2011 Bronstein et al.
2011/0270604 A1* 11/2011 Qi ......................... G06F 16/3344
704/9

(Continued)

OTHER PUBLICATIONS

Chaudhury et al., "Conditional Generation of Multi-modal Data Using Constrained Embedding Space Mapping", arXiv:1707.00860v2 [cs.LG], Jul. 26, 2017, 7 pages.

(Continued)

*Primary Examiner* — Cam Linh T Nguyen
(74) *Attorney, Agent, or Firm* — Tutunjian & Bitetto, P.C.; Randall Bluestone

(57) ABSTRACT

A computer-implemented method, computer program product, and system are provided for learning mapping information between different modalities of data. The method includes mapping, by a processor, high-dimensional modalities of data into a low-dimensional manifold to obtain therefor respective low-dimensional embeddings through at least a part of a first network. The method further includes projecting, by the processor, each of the respective low-dimensional embeddings to a common latent space to obtain therefor a respective one of separate latent space distributions in the common latent space through at least a part of a second network. The method also includes optimizing, by the processor, parameters of each of the networks by minimizing a distance between the separate latent space distributions in the common latent space using a variational lower bound. The method additionally includes outputting, by the processor, the parameters as the mapping information.

20 Claims, 9 Drawing Sheets

(56) References Cited

U.S. PATENT DOCUMENTS

| | | | |
|---|---|---|---|
| 2012/0179634 A1* | 7/2012 | Chen .................... | G06N 20/00 |
| | | | 706/12 |
| 2015/0356199 A1* | 12/2015 | Mei ..................... | G06F 16/86 |
| | | | 707/728 |
| 2016/0065534 A1* | 3/2016 | Liu ..................... | G06F 16/287 |
| | | | 707/728 |
| 2016/0242690 A1* | 8/2016 | Principe .............. | A61B 5/04012 |
| 2017/0091319 A1 | 3/2017 | Legrand et al. | |
| 2017/0206435 A1 | 7/2017 | Jin et al. | |
| 2017/0206696 A1* | 7/2017 | Bailey ................... | G06T 13/20 |
| 2018/0336241 A1* | 11/2018 | Noh ...................... | G06F 16/242 |
| 2019/0087426 A1* | 3/2019 | Kapoor ............... | G06F 16/3328 |
| 2019/0294671 A1* | 9/2019 | Chatterjee ............... | G06F 40/30 |
| 2019/0303465 A1* | 10/2019 | Shanmugamani .. | G06F 16/2237 |

OTHER PUBLICATIONS

Karpathy et al., "Deep Visual-Semantic Alignments for Generating Image Descriptions", IEEE Conference on Computer Vision and Pattern Recognition (CVPR), Jun. 2015, 1 page.

Mansimov et al., "Generating Images from Captions With Attention", arXiv:1511.02793v2 [cs.LG], Feb. 29, 2016, pp. 1-12.

Mao et al., "Explain Images with Multimodal Recurrent Neural Networks", arXiv.org > cs > arXiv:1410.1090, Oct. 2014, 2 pages.

Chaudhury et al.,"Text to Image Generative Model Using Constrained Embedding Space Mapping", 2017 IEEE International Workshop on Machine Learning for Signal Processing, Sep. 2017, 6 pages.

Ngiam, et al. "Multimodal Deep Learning", In Proceedings of the 28 th International Con-ference on Machine Learning, Jul. 2011, 8 pages.

Reed et al., "Generative Adversarial Text to Image Synthesis", feaarXiv:1605.05396v2 [cs.NE], Jun. 5, 2016, 10 pages.

Suzuki,, et al., "Joint Multimodal Learning with Deep Generative Models", arXiv:1611.01891v1 [stat.ML], Nov. 7, 2016, pp. 1-12.

Vinyals, et al., "Show and Tell: A Neural Image Caption Generator", IEEE Conference on Computer Vision and Pattern Recognition (CVPR), Jun. 2015, 1 page.

Wang et al., "Learning Deep Structure-Preserving Image-Text Embeddings", IEEE Conference on Computer Vision and Pattern Recognition (CVPR), Jun. 2016, 1 page.

* cited by examiner

GENERATING CROSS-DOMAIN DATA USING VARIATIONAL MAPPING BETWEEN EMBEDDING SPACES

BACKGROUND

Technical Field

The present invention relates generally to information processing and, in particular, to generating cross-domain data using variational mapping between embedding spaces.

Description of the Related Art

Cross-domain data generation typically involves the mapping of data from a source domain S to a target domain T such that the output of a given function $f$, which accepts inputs in either domain, remains unchanged. However, the two domains often have different natures of data distribution, making the mapping employed across different modalities, in current approaches, difficult to implement. Hence, there is a need for an improved approach for cross-domain data generation.

SUMMARY

According to an aspect of the present invention, a computer-implemented method is provided for learning mapping information between different modalities of data. The method includes mapping, by a processor, high-dimensional modalities of data into a low-dimensional manifold to obtain therefor respective low-dimensional embeddings through at least a part of a first network. The method further includes projecting, by the processor, each of the respective low-dimensional embeddings to a common latent space to obtain therefor a respective one of separate latent space distributions in the common latent space through at least a part of a second network. The method also includes optimizing, by the processor, parameters of each of the networks by minimizing a distance between the separate latent space distributions in the common latent space using a variational lower bound. The method additionally includes outputting, by the processor, the parameters as the mapping information.

According to another aspect of the present invention, a computer program product is provided for learning mapping information between different modalities of data. The computer program product includes a non-transitory computer readable storage medium having program instructions embodied therewith. The program instructions are executable by a computer to cause the computer to perform a method. The method includes mapping, by a processor of the computer, high-dimensional modalities of data into a low-dimensional manifold to obtain therefor respective low-dimensional embeddings through at least a part of a first network. The method further includes projecting, by the processor, each of the respective low-dimensional embeddings to a common latent space to obtain therefor a respective one of separate latent space distributions in the common latent space through at least a part of a second network. The method also includes optimizing, by the processor, parameters of each of the networks by minimizing a distance between the separate latent space distributions in the common latent space using a variational lower bound. The method additionally includes outputting, by the processor, the parameters as the mapping information.

According to yet another aspect of the present invention, a system is provided for learning mapping information between different modalities of data. The system includes a processor. The processor is configured to map high-dimensional modalities of data into a low-dimensional manifold to obtain therefor respective low-dimensional embeddings through at least a part of a first network. The processor is further configured to project each of the respective low-dimensional embeddings to a common latent space to obtain therefor a respective one of separate latent space distributions in the common latent space through at least a part of a second network. The processor is also configured to optimize parameters of each of the networks by minimizing a distance between the separate latent space distributions in the common latent space using a variational lower bound. The processor is additionally configured to output the parameters as the mapping information.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to generating cross-domain data using variational mapping between embedding spaces.

In an embodiment, the present invention finds the joint probability between multiple modalities of data in order to enable generation between different data modalities.

For example, consider two modalities of data X and Y Given multiple instances $\{x_i\}$ and $\{y_i\}$ of the data, the goal is to find the joint distribution p(X,Y) as follows:

$$\theta^*=\arg\min_\theta[-\Sigma_i \log(p_\theta(x^i,y^j))].$$

The generative model can be used for conditional inference to generate corresponding mappings from one data modality to another. For example, if the joint distribution of a scene description as text or audio and the corresponding image of the scene from multiple examples are learned, then using the proposed method, we can learn to generate pairs of novel image and caption pairs. By conditioning over one data modality, the other modality data can be generated. Thus problems including, but not limited to, for example, scene image to captioning and scene description to image generation can be solved by the present invention.

In an embodiment, the present invention provides an approach to learn mappings between the distributions of multiple modalities of data by projecting them to a common latent space distribution and optimizing the network parameters by a variational lower bound.

In an embodiment, the present invention divides the common latent space distributions into separate latent spaces and formulates a novel variational lower bound that minimizes the distance between the individual latent spaces.

In an embodiment, the present invention optimizes the variational lower bound, which can include terms for (i) minimizing the distance between two latent spaces so that they represent the same semantic meaning, (ii) forcing the latent distributions to be the same as a prior distribution designed by the user to enable Bayesian inference, and (iii) minimizing the reconstruction error so that the input and output data instances are equal. Of course, other terms can also be included, depending upon the implementation, as readily appreciated by one of ordinary skill in the art given the teachings of the present invention provided herein, while maintaining the spirit of the present invention.

Figure 1:
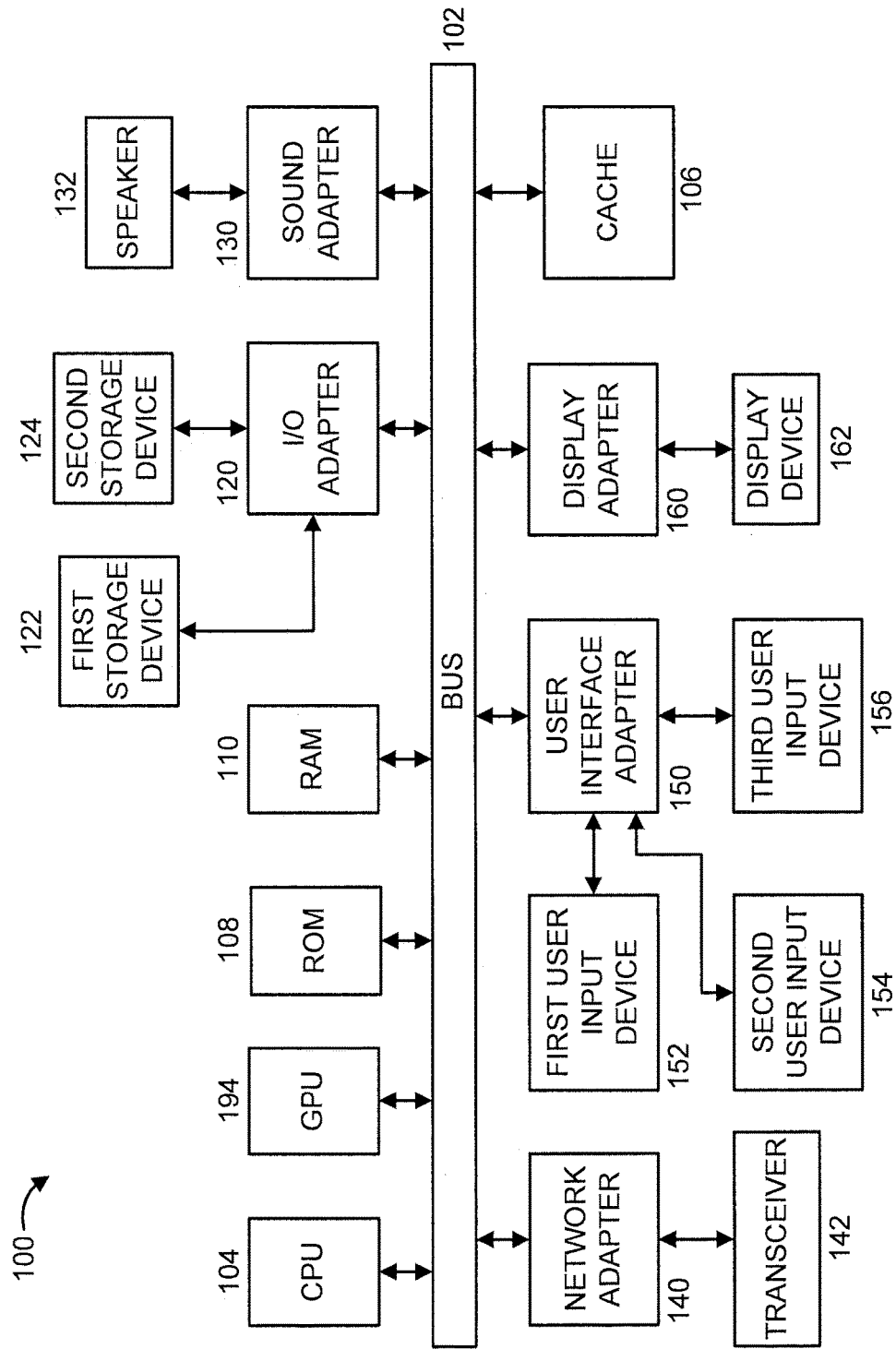
FIG. 1 is a block diagram showing an exemplary processing system to which the invention principles may be applied, in accordance with an embodiment of the present invention.

FIG. 1 is a block diagram showing an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
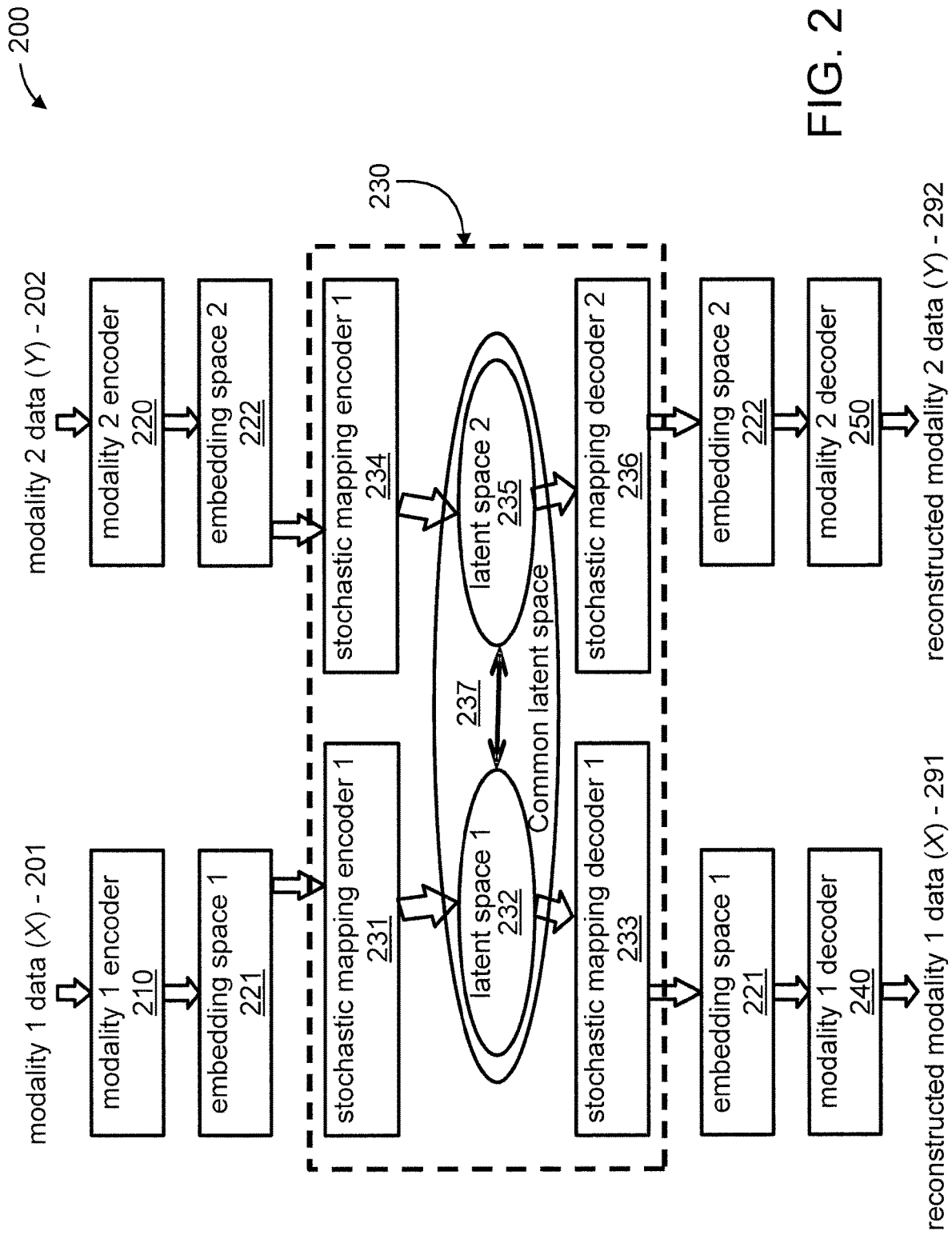
FIG. 2 is a block diagram showing an exemplary system for generating cross-domain data using variational mapping between embedding spaces, in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 5:
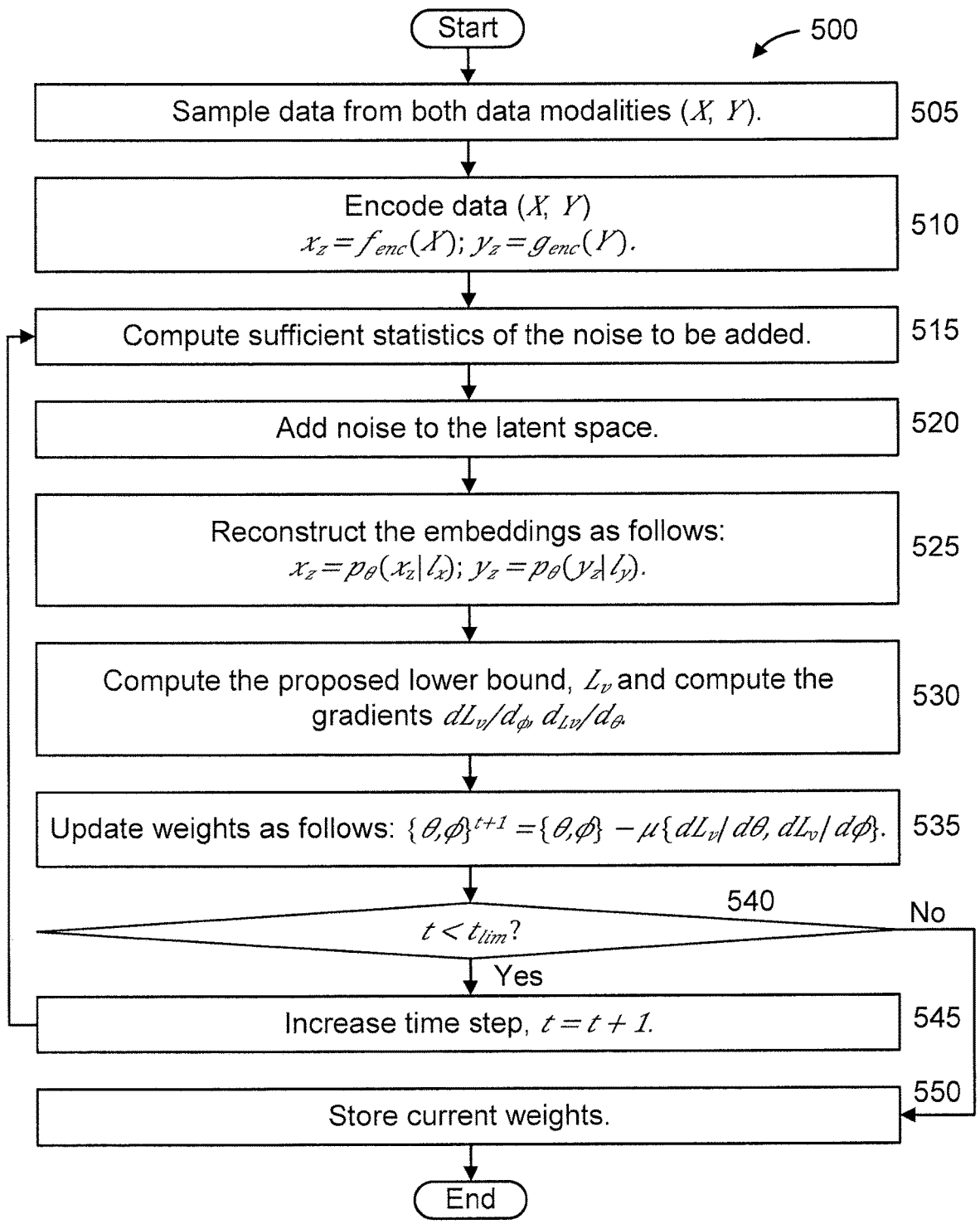
FIG. 5 is a flow diagram showing an exemplary method for training a system for generating cross-domain data using variational mapping between embedding spaces, in accordance with an embodiment of the present invention.
Figure 6:
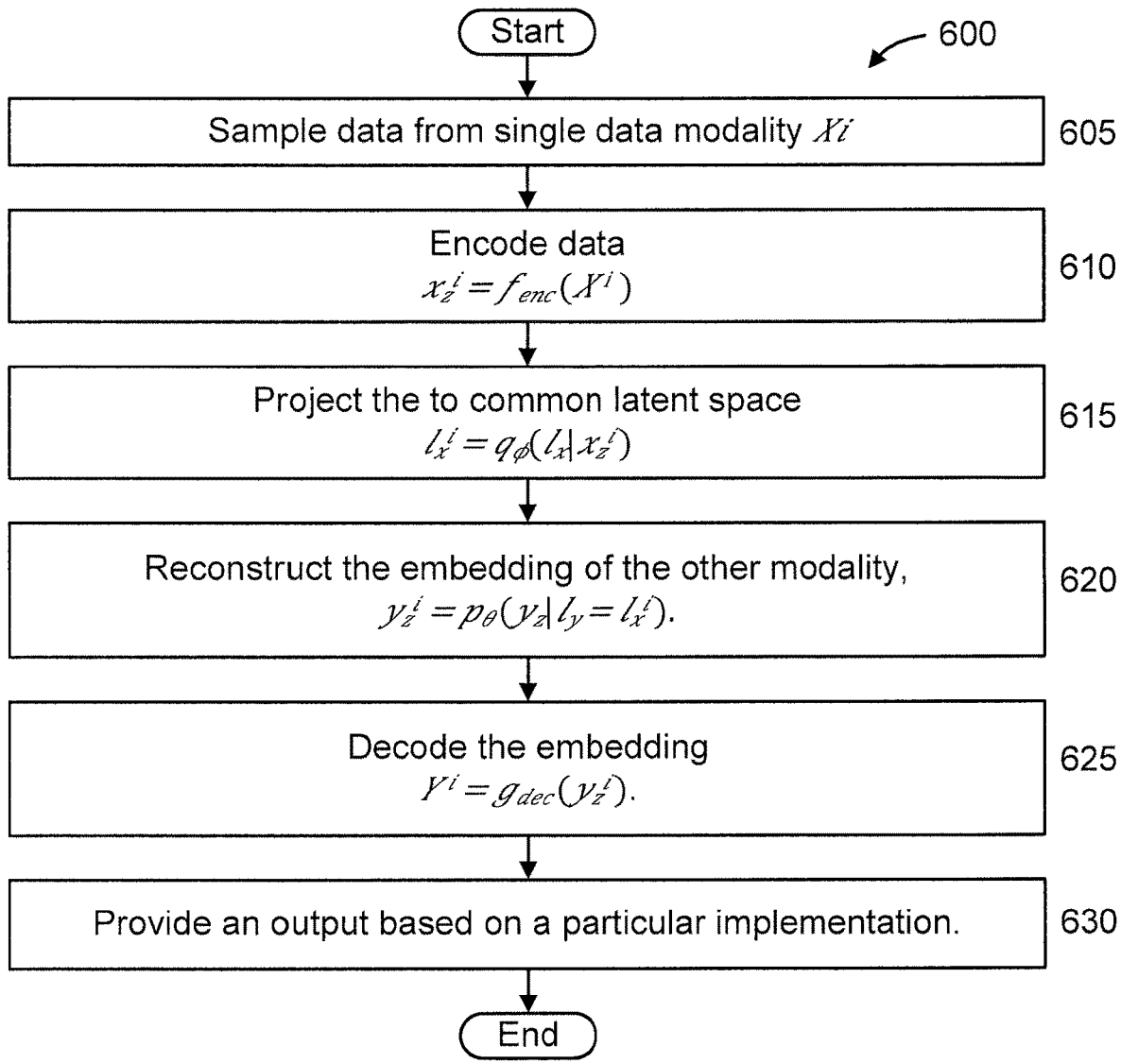
FIG. 6 is a flow diagram showing an exemplary method for generating cross-domain data using variational mapping between embedding spaces, in accordance with an embodiment of the present invention.

Further, it is to be appreciated that processing system 100 may perform at least part of the method described herein including, for example, at least part of method 500 of FIG. 5 and/or at least part of method 600 of FIG. 6. Similarly, part or all of system 200 may be used to perform at least part of method 500 of FIG. 5 and/or at least part of method 600 of FIG. 6.

FIG. 2 is a block diagram showing an exemplary system 200 for generating cross-domain data using variational mapping between embedding spaces, in accordance with an embodiment of the present invention.

As inputs, the system 200 receives modality 1 data (X) 201 and modality 2 data (Y) 202. As outputs, the system 200 provides reconstructed modality 1 data (X) 291 and reconstructed modality 2 data (Y) 292.

The system 200 includes a modality 1 encoder 210, an embedding space 1 211, a modality 2 encoder 220, an embedding space 2 221, a variational mapper 230, a modality 1 decoder 240, and a modality 2 decoder 250.

The variational mapper 230 includes a stochastic mapping encoder 1 231, a latent space 1 232, a stochastic mapping decoder 1 233, a stochastic mapping encoder 2 234, a latent space 2 235, a stochastic mapping decoder 2 236, and a common latent space 237.

The modality 1 encoder 210 and modality 2 encoder 220 are pre-trained data encoders. First, the raw input data is encoded to a semantically meaningful embedding space. For example, variational autoencoders or generative adversarial networks can be used to map images to such embedding spaces. In an embodiment, the modality 1 encoder 210 and modality 2 encoder 220 can be considered to form a manifold. For example, in an embodiment, the modality 1 encoder 210 and modality 2 encoder 220 can be considered to form a low-dimensional manifold configured to receive high-dimensional data and generate low-dimensional embeddings therefrom. While the preceding example involves a dimension (high to low) reduction from the raw data to the embeddings, in other embodiments, such reduction is not performed. The afore-mentioned term manifold represents a vector space with the property that data resides only in some special subspace of the entire vector spaces, representing a high dimensional surface.

The stochastic mapping encoder 1 231 and stochastic mapping encoder 2 234 receive embeddings (i.e., embedding space 1 211 and embedding space 2 221, respectively) as inputs and produces a common latent space 237 which is a vector of random variables. Ideally, to generate a common latent space 237 from a multiplicity of data modalities, simultaneous input is received from all data modalities. The encoding process is decoupled to enable independently generating the latent representation from each data modality. Thus, the actual lower bound is approximated with an approximate lower bound enabling the aforementioned encoder decoupling. In an embodiment, the stochastic mapping encoder 1 231 and the stochastic mapping encoder 2 234 can be implemented using neural networks (e.g., stochastic neural networks). In an embodiment, the stochastic mapping encoder 1 231 and the stochastic mapping encoder 2 234 can be implemented using Generative Adversarial Networks (GANs), e.g., for images. In an embodiment, the stochastic mapping encoder 1 231 and the stochastic mapping encoder 2 234 can be implemented using Variational AutoEncoders (VAEs), e.g., for images. Of course, as readily appreciated by one of ordinary skill in the art given the teachings of the present invention provided herein, other types of elements (word2vec models for words, etc.) can be used to implement the encoders 231 and 234 while maintaining the spirit of the present invention.

The stochastic mapping decoder 1 233 and stochastic mapping decoder 2 236 map the common latent space 237 back to the embedding spaces (i.e., embedding space 1 211 and embedding space 2 221, respectively). The stochastic mapping decoder 1 233 and stochastic mapping decoder 2 236 are trained by optimizing the reconstruction loss for the embedding spaces (i.e., embedding space 1 211 and embedding space 2 221, respectively). In an embodiment, the stochastic mapping decoder 1 233 and the stochastic mapping decoder 2 236 can be implemented using neural networks (e.g., stochastic neural networks). Moreover, similar to the encoders 231 and 234, the decoders 233 and 236 can also be implemented using GANs and/or VAEs and/or word2vec models and/or so forth.

The modality 1 decoder 240 and modality 2 decoder 250 are pre-trained data decoders. The reconstructed embeddings (reconstructed modality 1 data (X) 291 and reconstructed modality 2 data (Y) 292, respectively) are reconstructed back to the raw data distributions which are the main output of the system.

Thus, system 200 performs stochastic mapping of multi-modal data to a common latent distribution. The present invention decouples the common latent distributions to separate distributions to learn multi-modal distribution as Bayesian inference which enables conditional inference to generate one data modality from another.

In the embodiment shown in FIG. 2, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

Figure 3:
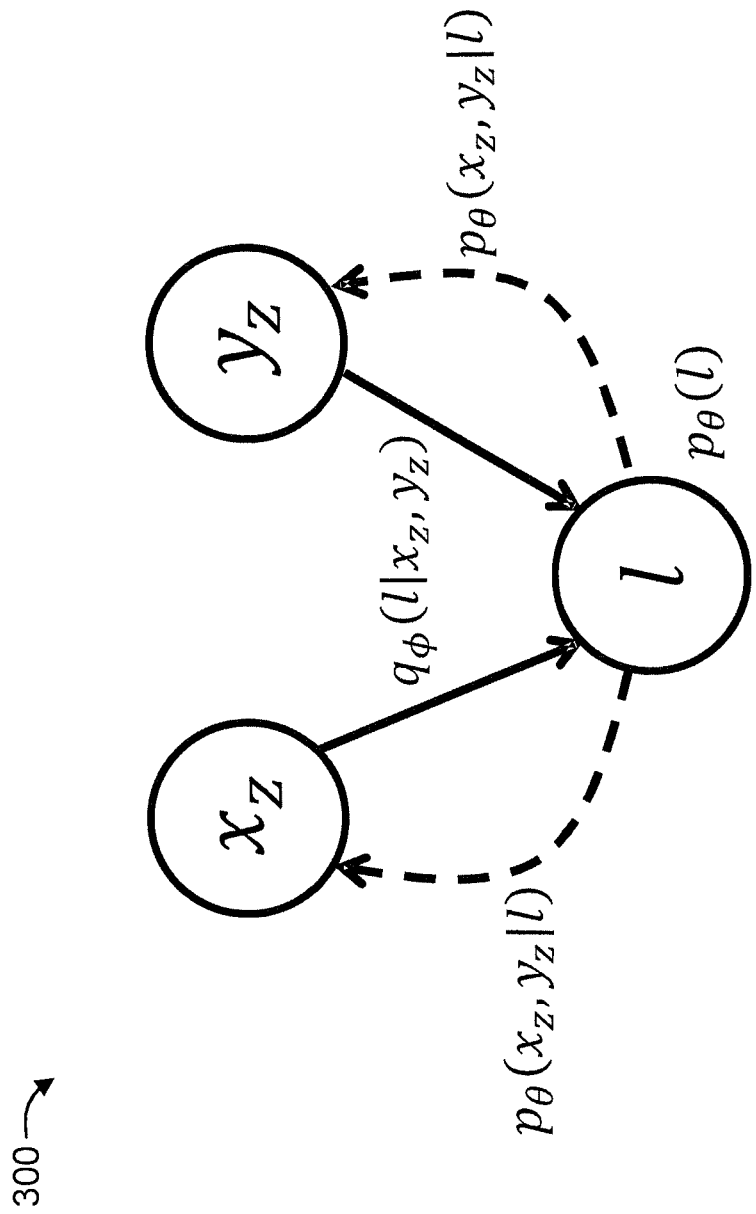
FIG. 3 is a flow diagram showing an ideal graphical model, in accordance with an embodiment of the present invention.
Figure 4:
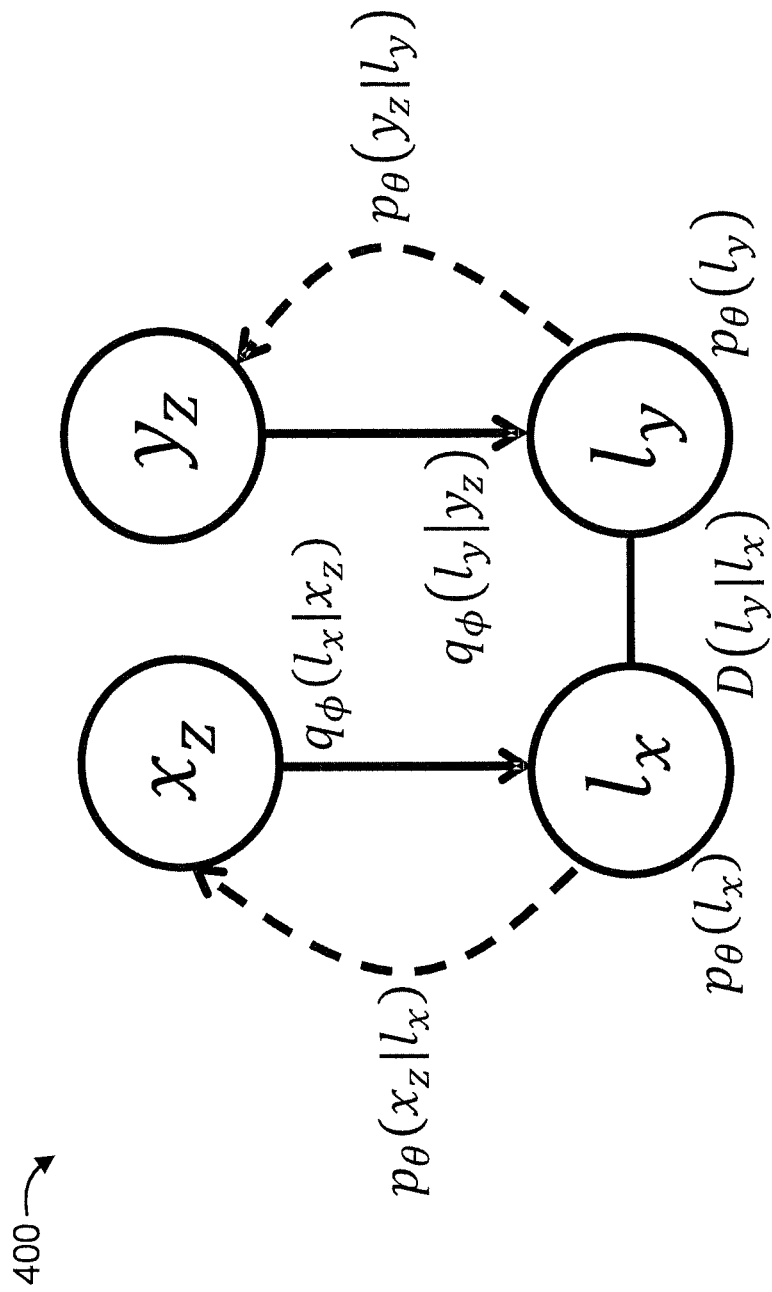
FIG. 4 is a flow diagram showing an exemplary proposed approximate graphical model, in accordance with an embodiment of the present invention.

FIG. 3 is a flow diagram showing an ideal graphical model 300, in accordance with an embodiment of the present invention. FIG. 4 is a flow diagram showing an exemplary proposed approximate graphical model 400, in accordance with an embodiment of the present invention.

The encoder $q_\phi(l|x_z,y_z)$, implemented by stochastic mapping encoder 1 231 and stochastic mapping encoder 2 234, requires both data modalities for predicting the shared (common) latent space 237.

To enable generation of cross domain data modalities, we decouple the latent space distribution to separate latent distributions $q_\phi(l_x|x_z)$ and $q_\phi(l_y|y_z)$, and optimize an approximate lower bound $L_v$.

Regarding the ideal graphical model 300, the following applies:

Variational approximation    prior distribution $$\log[p(x_z, y_z)] \geq -D_{KL}(q_\phi(l|x_z, y_z) \| p_\theta(l)) + E_{q_\phi(l|x_z, y_z)}(p_\theta(x_z, y_z/l)).$$

Regarding the proposed approximate graphical model 400, the following applies. The proposed lower bound is as follows:

$$L_v = -D_{KL}(q_\phi(l_x|x_z) \| p_\theta(l_x)) - D_{KL}(q_\phi(l_y|y_z) \| p_\theta(l_y)) - D(q_\phi(l_x|x_z) \| q_\phi(l_y|y_z)) + E_{q_\phi(l_x|x_z)}(p_\theta(x_z/l_x)) + E_{q_\phi(l_y|y_z)}(p_\theta(y_z/l_y)).$$

Hence, in an embodiment, the objective is to maximize the above lower bound to learn the joint generative model of the two modalities.

FIG. 5 is a flow diagram showing an exemplary method 500 for training a system for generating cross-domain data using variational mapping between embedding spaces, in accordance with an embodiment of the present invention.

At block 505, sample data from both data modalities.

At block 510, encode data (X,Y) such that $x_z = f_{enc}(X)$; $y_z = g_{enc}(Y)$.

At block 515, compute sufficient statistics of the noise to be added.

At block 520, add noise to the latent space.

At block 525, reconstruct the embeddings as follows: $x_z = p_\theta(x_z|l_x)$; $y_z = p_\theta(y_z|l_y)$.

At block 530, compute the proposed lower bound, $L_v$, and compute the gradients $$\frac{dL_v}{d\phi}, \frac{dL_v}{d\theta}.$$

At block 535, update weights as follows:

$$\{\theta, \phi\}^{t+1} = \{\theta, \phi\}^t - \mu \left\{ \frac{dL_v}{d\theta}, \frac{dL_v}{d\phi} \right\}.$$

At block 540, determine whether or not t<$t_{lim}$. If so, then proceed to block 545. Otherwise, proceed to block 550.

At block 545, increase the time step t such that t=t+1.

At block 550, store the current weights. The current weights that are stored represent the linear or non-linear transformation parameters applied by the model to map the embeddings in a common latent space and for the reconstruction of the embeddings back from the common latent space. For example, in multi layered perceptron, they represent the weights of each of the layers.

FIG. 6 is a flow diagram showing an exemplary method 600 for generating cross-domain data using variational mapping between embedding spaces, in accordance with an embodiment of the present invention.

At block 605, sample data from single data modality $X^i$.

At block 610, encode data as follows: $x_z^i = f_{enc}(X^i)$.

At block 615, project to the common latent space as follows: $l_x^i = q_\phi(l_x | x_z^i)$.

At block 620, reconstruct the embedding of the other modality, as follows:

$$y_z^i = p_\theta(y_z | l_y = l_x^i).$$

At block 625, decode the embedding, as follows:

$$Y^i = g_{dec}(y_z^i).$$

At block 630, provide an output based on a particular implementation. For example, output the decoded embedding corresponding to one particular data modality with data from another modality. Further to the preceding example, the two involved data modalities can respectively involve, for example, images and text such that the text serves as a caption for the images. In another embodiment, data of one modality can be converted to data of another modality for the purpose of compatibility with respect to any of, for example, a software application, a database, a format, and so forth. In other embodiments, any of scene image to captioning generation and/or scene description to image generation, and/or so forth can be performed. Furthermore, since the proposed method learns to map general distributions from one domain to the other, it can also be used for mapping similar images of scenes in different conditions, for e.g., daytime to nighttime images of the same location, summer to winter images, and so forth. Thus, mappings can be performed between images of the same or similar scene under different weather conditions, different lighting conditions, different background conditions, different foreground conditions, different occlusion conditions, and so forth. Additional applications include adding artistic qualities to natural images from drawing styles, converting hand-writing images of one person to another, converting words in a given language to corresponding words in another language, and other domain transfer applications as readily appreciated by one of ordinary skill in the art given the teachings of the present invention provided herein.

It is to be appreciated that in an embodiment blocks 615 and 620 can use the stored weights from training (i.e., from block 550 of method 500).

Figure 7:
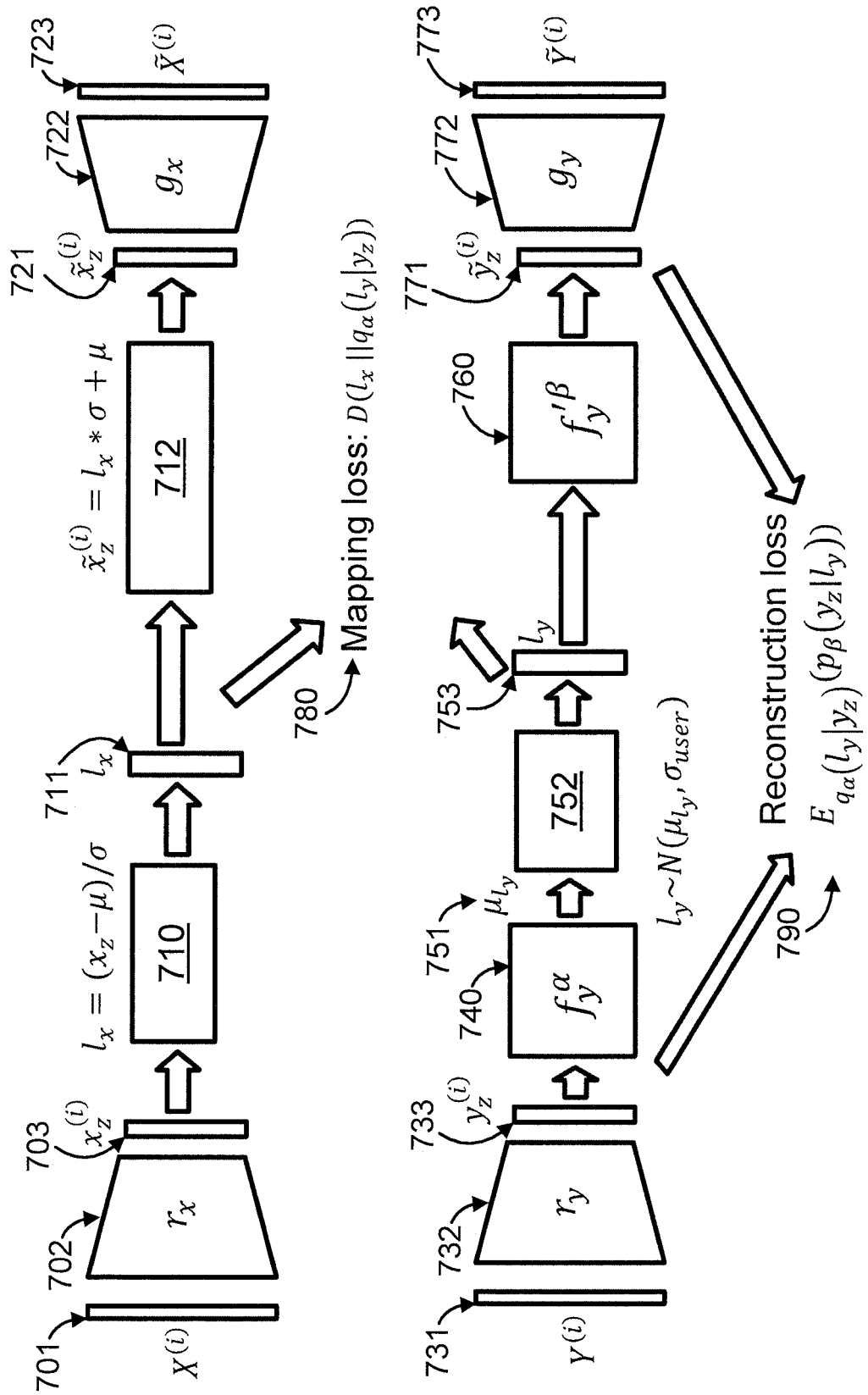
FIG. 7 shows an exemplary mapping model architecture, in accordance with an embodiment of the present invention.

FIG. 7 shows an exemplary mapping model architecture 700, in accordance with an embodiment of the present invention. In the mapping model architecture 700, the image embedding is kept fixed and the variational inference is performed on audio or text embedding to a shared latent space. For the shared latent space, a Gaussian distribution is assumed. The variance of the distribution is changed externally while the model produces the mean of the latent distribution from the embedding of audio or text. During inference, cross modal generation from audio or text to image is performed by replacing latent representation obtained from text to corresponding latent code for image and subsequently reconstructing the image back using a decoder. The cross-modal reconstruction accuracy is evaluated using PSNR values.

The architecture 700 includes modality 1 data $X^{(i)}$ 701, a pre-trained image encoder $r_x$ 702, encoded data $x_z^{(i)}$ 703, a normalizer $l_x = (x_z - \mu)/\sigma$ 710, shared latent space $l_x$ 711, an un-normalizer $\tilde{x}_z^{(i)} = l_x * \sigma + \mu$ 712, the reconstructed image embedding $\tilde{x}_z^{(i)}$ 721, a pre-trained image decoder $g_x$ 722, and reconstructed modality 1 data $\tilde{X}^{(i)}$ 723.

The architecture 700 further includes modality 2 data $y^{(i)}$ 731, a pre-trained audio or text encoder $r_y$ 732, encoded data $y_z^{(i)}$ 733, the model mapping embedding to the mean of the Gaussian latent distribution $f_y^\alpha$ 740, the mean of the Gaussian latent distribution $\mu_{l_y}$ 751, added Gaussian noise $l_y \sim N(\mu_{l_y}, \sigma_{user})$ 752, the shared latent space $l_y$ 753, the decoder back to the modality 2 embedding $f_y^{'\beta}$ 760, the reconstructed audio or text embedding $\tilde{y}_z^{(i)}$ 771, a pre-trained audio or text decoder $g_y$ 772, and reconstructed modality 2 data $\hat{Y}^{(i)}$ 773.

The architecture 700 further includes a mapping loss $D(l_x \| q_\alpha(l_y | y_z))$ 780.

The architecture 700 additionally includes a reconstruction loss $E_{q_\alpha(l_y | y_z)}(p_\beta(y_z | l_y))$ 790.

A description will now be given regarding a particular experimental example of the present invention, in accordance with an embodiment of the present invention.

In the example, double digit numbers (for a total of 100 classes) are created by concatenating Modified National Institute of Standards and Technology (MNIST) digit images horizontally.

During training of the image auto-encoder, a set of 16 two-digit classes are randomly removed and training is performed on (using) the remaining 84 image classes (of the 100 total classes).

For the word embeddings, the embedding of each digit are concatenated.

While learning the mapping between image and word embeddings, we hide the mapping between those 16 image classes and learn the mapping only on the 84 classes of image-word combinations.

During testing, we give the word embeddings of those sixteen two-digit numbers and generate the corresponding images.

As a baseline method, we compare with the deterministic mapping case, where the mapping from the audio or text embedding to the image space is directly learned using a conditional distribution mapping.

The following mapping model architecture is considered, where the image embedding is kept fixed and the variational inference is performed on audio or text embedding to latent space.

A description will now be given of various exemplary metric that can be used in accordance with the present invention, in accordance with an embodiment of the present invention.

For text to image generation: PSNR of the generated image compared to the closest image in the test set is used as image quality evaluation metric for text to image generation, as follows:

$$PSNR = 20 \log \left( \frac{\text{maximum pixel intensity}}{\sqrt{\min_i \| x_{pred} - x_{test}^i \|_2^2}} \right).$$

For image to text generation: Accuracy of correctly classifying digit prediction from images is performed by classification accuracy on the unseen test set, as follows:

$$acc = \sum_{1}^{N} \frac{1(y_{pred} = y_{true})}{N_{test}}.$$

Table 1 shows a qualitative comparison that, in turn, shows that variational mapping in accordance with the present invention is more effective for bi-directional generation.

TABLE 1

| standard deviation | Accuracy (%) | PSNR |
| --- | --- | --- |
| 0.0 (baseline) | 10.19 | 16.43 |
| 0.01 (this invention) | 24.32 | 16.44 |
| 0.5 (this invention) | 71.45 | 16.42 |
| 1.0 (this invention) | 76.56 | 16.4 |
| 2.0 (this invention) | 58.17 | 16.35 |
| 5.0 (this invention) | 04.32 | 16.40 |

A description will now be given of various advantages of the present invention over the prior art, in accordance with various embodiments of the present invention.

One advantage is that the present invention considers the mapping from the embedding space to the common latent space as a stochastic neural network which provides benefits compared to deterministic neural networks.

Another advantage is that while the prior art requires both modalities for inferring the latent space which limits conditional generation of data from one modality to another, the proposed decoupling of latent spaces allows cross modal data generation from separate single data modalities.

Yet another advantage is that while prior art approaches are limited to either text to image captioning or text to image generation, the proposed method can solve both problems together. In fact, using the proposed framework, it is even possible to map multiple modalities together.

These and other advantages of the present invention are readily contemplated by one of ordinary skill in the art given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
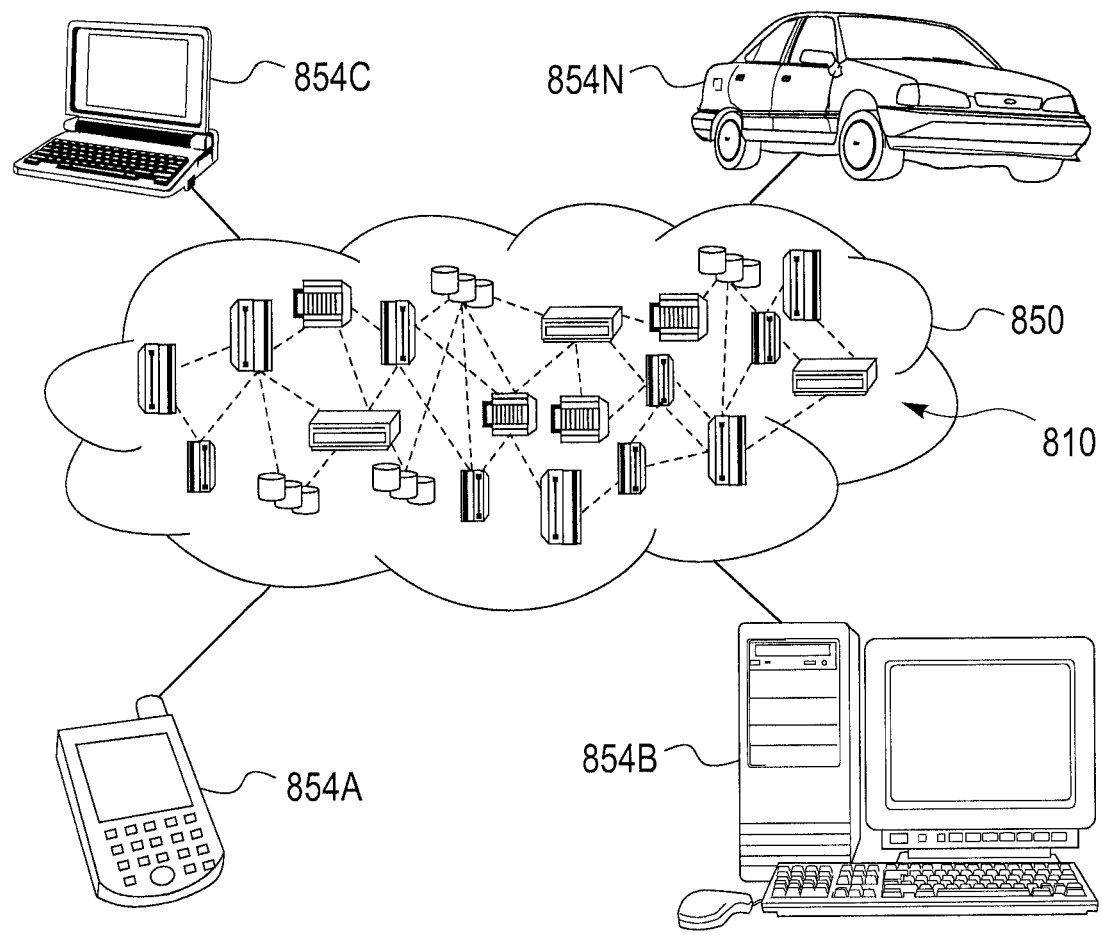
FIG. 8 is a block diagram showing an illustrative cloud computing environment having one or more cloud computing nodes with which local computing devices used by cloud consumers communicate in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
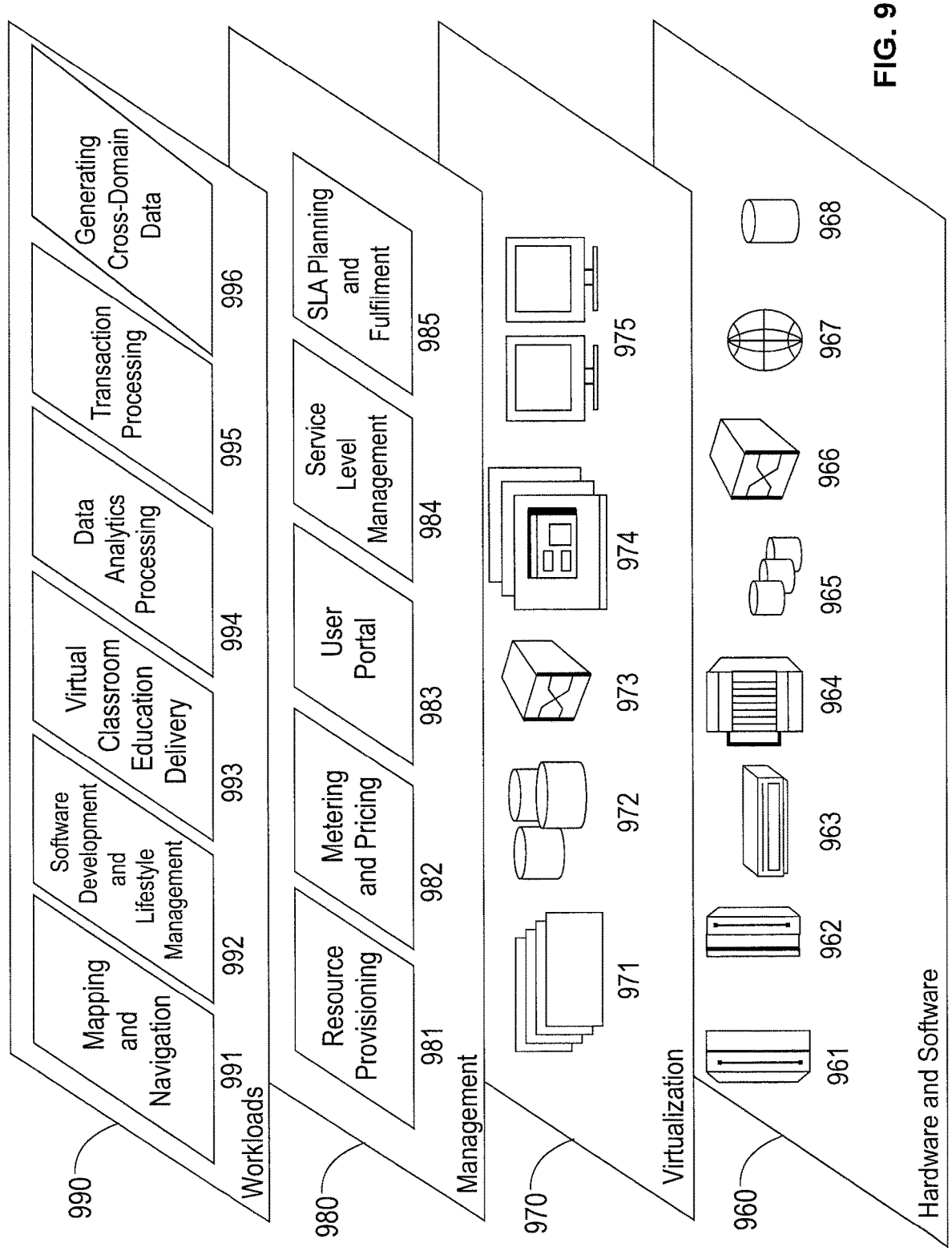
FIG. 9 is a block diagram showing a set of functional abstraction layers provided by a cloud computing environment in accordance with an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and generating cross-domain data using variational mapping between embedding spaces 996.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for learning mapping information between different modalities of data, comprising:

mapping, by a processor, high-dimensional modalities of data into a low-dimensional manifold to obtain therefor respective low-dimensional embeddings through at least a part of a first network;

projecting, by the processor, each of the respective low-dimensional embeddings to a common latent space to obtain therefor a respective one of separate latent space distributions in the common latent space through at least a part of a second network;

optimizing, by the processor, parameters of each of the networks by minimizing a distance between the separate latent space distributions in the common latent space using a variational lower bound; and outputting, by the processor, the parameters as the mapping information.

2. The computer-implemented method of claim 1, wherein said optimizing step is performed to minimize a respective reconstruction error for reconstructed versions of each of the different modalities of data.

3. The computer-implemented method of claim 1, wherein the variational lower bound comprises a set of terms for making the separate latent space distributions have a same semantic meaning by minimizing a distance between the separate latent space distributions in the common latent space.

4. The computer-implemented method of claim 1, wherein the variational lower bound comprises a set of terms for forcing the separate latent space distributions to be identical to a prior latent distribution designed by a user to enable Bayesian inference between the different modalities.

5. The computer-implemented method of claim 1, wherein the variational lower bound comprises a set of terms for minimizing a reconstruction error to equalize input and output data instances, the input data instances comprising the high dimensional modalities of data, the output data instances comprising reconstructed versions of the high dimensional modalities of data.

6. The computer-implemented method of claim 1, wherein separate generative models are used for the first network and the second network.

7. The computer-implemented method of claim 1, wherein the variational lower bound comprises a set of terms that comprise an embedding reconstruction loss, a prior latent distribution divergence, and a distance measure between the separate latent space distributions.

8. The computer-implemented method of claim 1, wherein the second network comprises a set of stochastic neural networks.

9. The computer-implemented method of claim 1, wherein said mapping step uses variational mapping to encode the high-dimensional modalities into the low-dimensional embeddings.

10. The computer-implemented method of claim 1, wherein the different modalities of data comprise a first modality of data and a second modality of data, and wherein the method further comprises generating cross-domain data of one of the first modality or the second modality based on data of another one of the first modality or the second modality and the mapping information.

11. The computer-implemented method of claim 10, further comprising populating a database with the cross-domain data responsive to the database being incompatible with the data of the other one of the first modality or the second modality.

12. The computer-implemented method of claim 10, further comprising captioning an image represented by one of the first modality or the second modality with text represented by the other one of the first modality or the second modality.

13. The computer-implemented method of claim 1, further comprising performing cross modal data generation based on the mapping information.

14. The computer-implemented method of claim 1, wherein the common latent space is configured for decoupled encoding between the different modalities of data.

15. A computer program product for learning mapping information between different modalities of data, the computer program product comprising a non-transitory computer readable storage medium having program instructions embodied therewith, the program instructions executable by a computer to cause the computer to perform a method comprising:

mapping, by a processor of the computer, high-dimensional modalities of data into a low-dimensional manifold to obtain therefor respective low-dimensional embeddings through at least a part of a first network;

projecting, by the processor, each of the respective low-dimensional embeddings to a common latent space to obtain therefor a respective one of separate latent space distributions in the common latent space through at least a part of a second network;

optimizing, by the processor, parameters of each of the networks by minimizing a distance between the separate latent space distributions in the common latent space using a variational lower bound; and outputting, by the processor, the parameters as the mapping information.

16. The computer program product of claim 15, wherein said optimizing step is performed to minimize a respective reconstruction error for reconstructed versions of each of the different modalities of data.

17. The computer program product of claim 15, wherein the variational lower bound comprises a set of terms for making the separate latent space distributions have a same semantic meaning by minimizing a distance between the separate latent space distributions in the common latent space.

18. The computer program product of claim 15, wherein the variational lower bound comprises a set of terms for forcing the separate latent space distributions to be identical to a prior latent distribution designed by a user to enable Bayesian inference between the different modalities.

19. The computer program product of claim 15, wherein the variational lower bound comprises a set of terms for minimizing a reconstruction error to equalize input and output data instances, the input data instances comprising the high dimensional modalities of data, the output data instances comprising reconstructed versions of the high dimensional modalities of data.

20. A system for learning mapping information between different modalities of data, comprising:

a processor, configured to map high-dimensional modalities of data into a low-dimensional manifold to obtain therefor respective low-dimensional embeddings through at least a part of a first network;

project each of the respective low-dimensional embeddings to a common latent space to obtain therefor a respective one of separate latent space distributions in the common latent space through at least a part of a second network;

optimize parameters of each of the networks by minimizing a distance between the separate latent space distributions in the common latent space using a variational lower bound; and output the parameters as the mapping information.

* * * * *